United States Patent
Heo et al.

(10) Patent No.: US 10,704,684 B2
(45) Date of Patent: Jul. 7, 2020

(54) TRANSMISSION PARKING SYSTEM INCLUDING NEUTRAL STATE MAINTAINING LOCK AND RELEASE DEVICE

(71) Applicants: Hyundai Motor Company, Seoul (KR); Kia Motors Corporation, Seoul (KR)

(72) Inventors: Jaesung Heo, Gyeonggi-do (KR); Kiyoung Song, Gyeonggi-do (KR); Sunghoon Lee, Daegu (KR); Hangil Park, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 199 days.

(21) Appl. No.: 15/944,507

(22) Filed: Apr. 3, 2018

(65) Prior Publication Data

US 2019/0178372 A1 Jun. 13, 2019

(30) Foreign Application Priority Data

Dec. 11, 2017 (KR) .................... 10-2017-0169257

(51) Int. Cl.
*F16H 61/18* (2006.01)
*F16H 61/16* (2006.01)
(Continued)

(52) U.S. Cl.
CPC ............. *F16H 61/18* (2013.01); *F16H 61/16* (2013.01); *F16H 61/22* (2013.01);
(Continued)

(58) Field of Classification Search
CPC .......... F16H 61/16; F16H 61/18; F16H 61/22; F16H 63/3475; F16H 2061/185; B60T 1/005

See application file for complete search history.

(56) References Cited

U.S. PATENT DOCUMENTS

| 4,518,066 A * | 5/1985 | Barr .................... B60T 1/005 188/31 |
| 9,488,273 B2 * | 11/2016 | Hopkins ............. F16H 63/3491 |

(Continued)

FOREIGN PATENT DOCUMENTS

| KR | 10-1453534 B1 | 11/2014 |
| KR | 10-1730029 B1 | 5/2017 |

*Primary Examiner* — Tinh Dang
(74) *Attorney, Agent, or Firm* — Mintz Levin Cohn Ferris Glovsky and Popeo, P.C.; Peter F. Corless

(57) ABSTRACT

A transmission parking system is provided. The system includes a parking gear and a parking rod that is connected with the parking gear. Additionally, a parking lever has a first end that is connected with the parking rod and the parking lever is installed rotatably around a control shaft. A detent return spring is wound around an exterior circumference of the control shaft, supports the parking lever, and provides elastic force to rotate the parking lever and return to an original position. A control lever is installed rotatably around the control shaft and is installed at an exterior side of the parking lever to allow user operation. A neutral state maintaining lock and release device is connected with the control lever and is changed to a neutral state lock or a neutral state release based on operation of the control lever.

12 Claims, 7 Drawing Sheets

(51) Int. Cl.
  *F16H 61/22* (2006.01)
  *F16H 63/34* (2006.01)
  *B60T 1/00* (2006.01)

(52) U.S. Cl.
  CPC ... *F16H 63/3475* (2013.01); *F16H 2061/185* (2013.01); *F16H 2061/223* (2013.01)

(56) References Cited

U.S. PATENT DOCUMENTS

| | | | |
|---|---|---|---|
| 9,555,777 B2* | 1/2017 | Takei | B60T 1/06 |
| 2004/0226801 A1 | 11/2004 | De Jonge et al. | |
| 2016/0169384 A1* | 6/2016 | Yukihara | F16H 63/3416 74/527 |
| 2018/0112774 A1* | 4/2018 | Littlefield | F16H 63/3466 |
| 2018/0328489 A1* | 11/2018 | Coats | B60T 1/062 |
| 2019/0257422 A1* | 8/2019 | Schlosser | F16H 63/3433 |

\* cited by examiner

TRANSMISSION PARKING SYSTEM INCLUDING NEUTRAL STATE MAINTAINING LOCK AND RELEASE DEVICE

CROSS-REFERENCE TO RELATED APPLICATION

This application claims priority to and the benefit of Korean Patent Application No. 10-2017-0169257 filed on Dec. 11, 2017, the entire contents of which are incorporated herein by reference.

BACKGROUND

(a) Field of the Invention

The present invention relates to a transmission parking system that includes a neutral state maintaining lock and release device, and more particularly, to a transmission parking system that includes a neutral state maintaining lock and release device which maintains a neutral maintaining lock state for a particular period of time when engine starting is off while the vehicle is being driven.

(b) Description of the Related Art

A transmission is a device that changes power generated from an engine to suitable torque to vehicle speed and delivers the torque to the vehicle, and the transmission is typically installed between a clutch and a propeller shaft. The driving condition of the vehicle changes between stopping, starting, low speed driving, high speed driving, reverse driving etc., and therefore, the transmission has to adjust the engine performance to correspond to each driving condition.

Further, vehicles that include a conventional shift-by wire lever adjust shift stages by communicating signal information with the transmission based on driver transmission intention (e.g., driver input). Without a mechanical connection between the transmission and the lever, the transmission moves suddenly to a parking stage (P) when engine starting is off while the vehicle is being driven, and therefore, the vehicle stops suddenly causing potential damage to the transmission. Further, when the vehicle starting is off by driver intention, the transmission condition may not be changed.

Accordingly, the condition of the transmission may be changed to be parking (P) and neutral (e.g., a state other than P) states when the engine starting is off by using a motor (e.g., an actuator) or a solenoid etc. FIG. 1 and FIG. 2 are schematic illustrations of a transmission parking system of a conventional shift by wire (SBW) vehicle according to the related art. The transmission parking system includes a parking gear 1, a parking rod 2 connected with the parking gear 1, a parking lever 3 having a first end connected with the parking rod 2 and rotatable around a control shaft 4, and a hydraulic pressure cylinder 6 connected with a second end of the parking lever 3 and configured to rotate the parking lever 3 by a hydraulic pressure.

In this transmission parking system, referring to FIG. 1 and FIG. 2, when engine starting is off, hydraulic pressure is removed from the hydraulic pressure cylinder 6, oil is removed from a solenoid apparatus, the hydraulic pressure cylinder 6 pushes the parking lever 3, the detent spring 5 responds, and the parking rod 2 is moved to a right side to engage with the parking gear 1 and thus, complete P stage engagement. Additionally, when engine starting is on, hydraulic pressure is generated from the hydraulic pressure cylinder 6, oil enters into the solenoid apparatus, the hydraulic pressure cylinder 6 pulls the parking lever 3, and the parking rod 2 is separated from the parking gear 1 to release the P stage.

After the vehicle is stopped by a user input and the engine starting is off, the vehicle is safe although the P stage is engaged. However, when the engine starting is unexpectedly off while the vehicle is being driven (e.g., in a condition that vehicle speed is greater than 0 due to unintentional operation), and the transmission is in P stage, the transmission may be damaged. Therefore, P stage release state has to be maintained until the vehicle speed is sufficiently reduced.

The above information disclosed in this section is merely for enhancement of understanding of the background of the invention and therefore it may contain information that does not form the prior art that is already known in this country to a person of ordinary skill in the art.

SUMMARY

The present invention provides a transmission parking system that includes a neutral state maintaining lock and release device to maintain a gear neutral state until the vehicle speed is sufficiently reduced and release the gear neutral state when vehicle starting is unexpectedly stopped while the vehicle is being driven.

A transmission parking system according to an exemplary embodiment of the present invention may include a parking gear, a parking rod connected with the parking gear, a parking lever having a first end connected with the parking rod and installed rotatably around a control shaft, a detent return spring wound around an exterior circumference of the control shaft, supporting the parking lever, and providing elastic force to rotate the parking lever and return to an original position, a control lever installed rotatably around the control shaft and installed at an exterior side of the parking lever to allow user operation, and a neutral state maintaining lock and release device connected with the control lever and changed to be a neutral state lock or a neutral state release based on an operation of the control lever.

In particular, the neutral state maintaining lock and release device may be connected with the control lever by a parking release cable. The parking release cable may move toward the control lever in a neutral state to maintain a release state, and move toward opposite side of the control lever in a neutral state to maintain a locking state. Additionally, the neutral state maintaining lock and release device may include an eye end connected with the parking release cable and may be configured to move forward and backward in a horizontal direction, a roller disposed at the eye end and configured to move and rotate in a horizontal direction to move the eye end in a horizontal direction, a solenoid body in which power is on or off and configured to move in a vertical direction with respect to the eye end, and a sliding cam disposed at a first side of the solenoid body and contacting the roller to move the eye end or restrict movement of the eye end.

The sliding cam may have an incline plane at a first side thereof and the roller contacts the incline plane when the roller rotates and moves in a horizontal direction and the solenoid body moves in a vertical direction. The sliding cam may have a vertical plane at a second side thereof (e.g., opposite to the first side), and the roller may contact the vertical plane to restrict movement of the eye end. Additionally, the roller may be positioned at the incline plane of the sliding cam in the neutral state to maintain the release state. The roller may be configured to rotate and move in a horizontal direction to an opposite side of the control lever to move the eye end in a horizontal direction to the opposite side of the control lever in the neutral state maintaining lock state.

Further, power may be on in a solenoid in the solenoid body to move the solenoid body in a vertical direction, and the roller may be configured to move from the vertical plane to the incline plane of the sliding cam in the neutral state to maintain the release state. The parking release cable may be connected with the neutral state maintaining lock and release device by a socket. In particular, the parking release cable may be inserted into and guided by a guide pipe disposed at the socket to be connected with the eye end.

According to an exemplary embodiment of the present invention, when an engine starting is unexpectedly off while the vehicle is being driven, a neutral state may be maintained until the vehicle speed is sufficiently reduced, therefore damage to the transmission may be prevented and the vehicle may be prevented from being overthrown. Further, vehicle cost and weight may be reduced by applying the neutral state maintaining lock and release device and the parking release cable instead of a conventional hydraulic pressure cylinder.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

DETAILED DESCRIPTION

Figure 1:
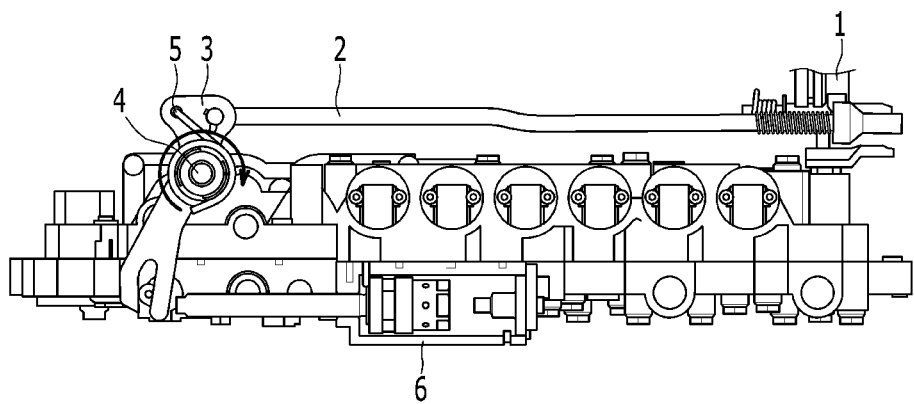
FIG. 1 is a schematic drawing illustrating a P stage engagement state when engine starting is off in a conventional SBW system according to the related art.
Figure 2:
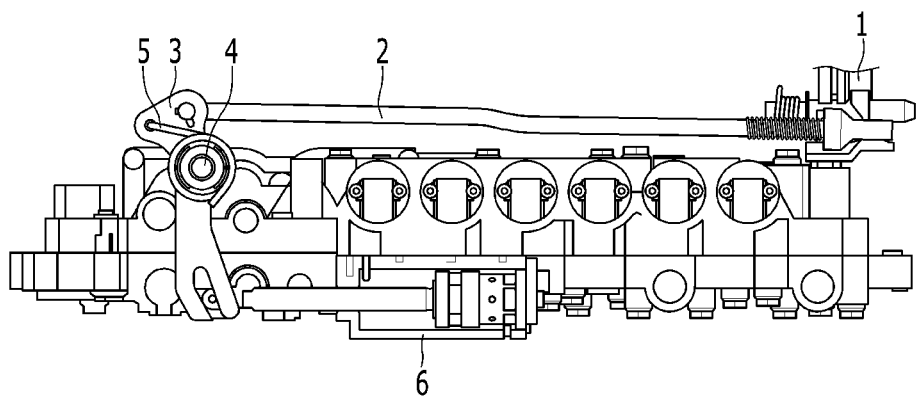
FIG. 2 is a schematic drawing illustrating a P stage release state when engine starting is on in a conventional SBW system according to the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present invention will be described more fully hereinafter with reference to the accompanying drawings, in which exemplary embodiments of the invention are shown. The present disclosure may be modified in various different ways, and is not limited to the exemplary embodiments described herein.

Additionally, in exemplary embodiments, since like reference numerals designate like elements having the same configuration, a one exemplary embodiment is representatively described, and in other exemplary embodiments, only a configuration different from one exemplary embodiment will be described. It is noted that the drawings are schematic and are not dimensionally illustrated. A relative size and a ratio of parts in the drawings may be exaggerated or reduced for clarity and convenience in the drawings and an arbitrary size is just illustrative but is not restrictive. In addition, the same reference numerals designate the same structures, elements, or parts illustrated in the two or more drawings in order to exhibit similar characteristics. It will be understood that when an element is referred to as being "on" or "over" another element, it can be directly on the other element or intervening elements may also be present.

An exemplary embodiment of the present invention specifically indicates an exemplary embodiment of the present invention. As a result, various modifications of the drawings are expected. Accordingly, the exemplary embodiment is not limited to a specific form of the illustrated region, and for example, includes a modification of a form by manufacturing.

Figure 3:
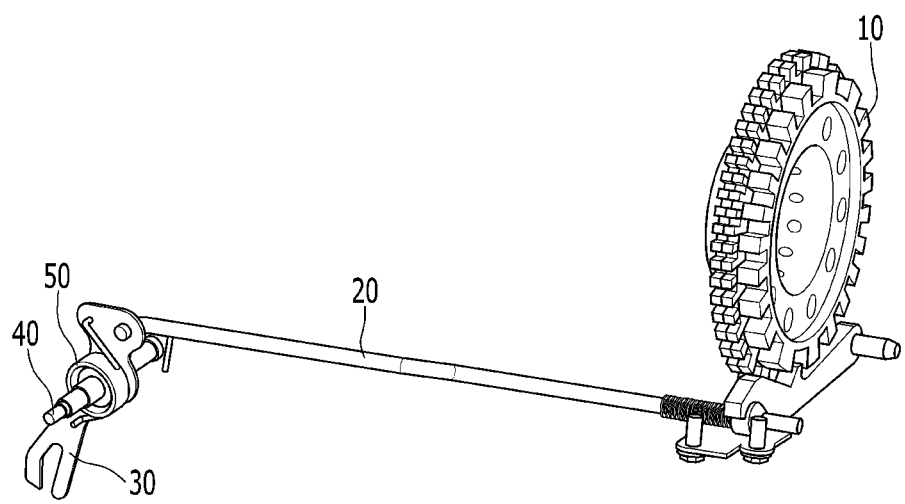
FIG. 3 is a schematic drawing illustrating a transmission parking system according to an exemplary embodiment of the present invention.
Figure 4:
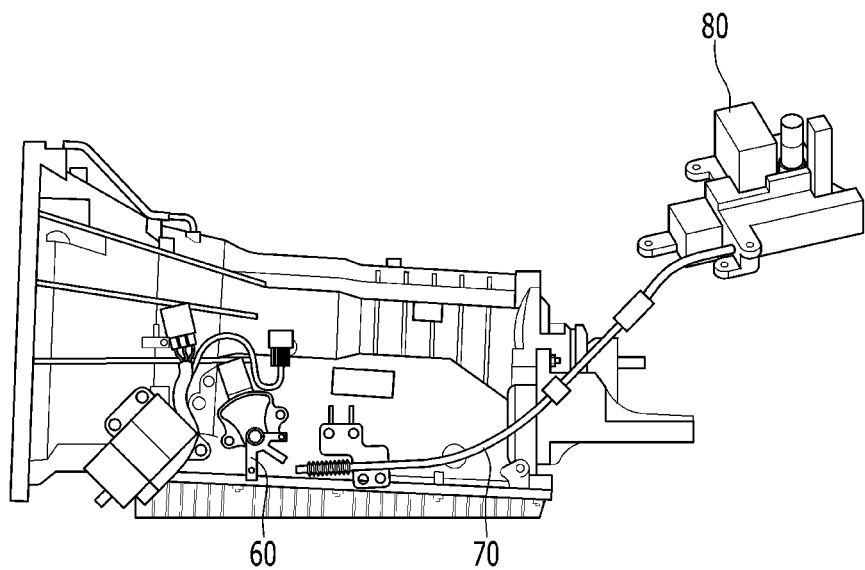
FIG. 4 is a schematic drawing illustrating a transmission parking system including a neutral state maintaining lock and release device according to an exemplary embodiment of the present invention.

Hereinafter, a transmission parking system according to an exemplary embodiment of the present invention will be described with FIG. 3 and FIG. 4. FIG. 3 is a schematic drawing illustrating a transmission parking system according to an exemplary embodiment of the present invention, and FIG. 4 is a schematic drawing illustrating a transmission parking system including a neutral state maintaining lock and release device according to an exemplary embodiment of the present invention. Referring to FIG. 3 and FIG. 4, a transmission parking system according to an exemplary embodiment of the present invention may include a parking gear 10, a parking lever 30, a detent return spring 50, a control lever 60, and a neutral state maintaining lock and release device 80.

In particular, the parking gear 10 may be connected with a first end of the parking rod 20 when a vehicle is in a parking state. A second end of the parking rod 20 may be rotatably connected with a first end of the parking lever 30, and the parking lever 30 may be installed rotatably around the control shaft 40. The parking lever 30 may be configured to rotate around the control shaft 40, and accordingly, the parking rod 20 may be moved toward the parking gear 10 to be connected with the parking gear 10 or moved away from the parking gear 10 to be released from the parking gear 10.

The detent return spring 50 may be wound around an exterior circumference of the control shaft 40 supporting the parking lever, may support the parking lever 30, and may be configured to provide elastic force to thus rotate the parking lever 30 and then return to an original position. The control lever 60 may be installed rotatably around the control shaft 40 and installed at an exterior side of the parking lever 30 to allow for user operation. A first end of the control lever 60 may be connected with a first end of the parking release cable 70, and a second end of the parking release cable 70 may be connected with the neutral state maintaining lock and release device 80.

The neutral state maintaining lock and release device 80 may be connected with the control lever 60 by the parking release cable 70, and may be changed to be a neutral state lock or neutral state release state based on operation of the control lever 60. The parking release cable 70 may be configured to move toward the control lever 60 in a neutral state to maintain a release state, and move toward an opposite side of the control lever 60 in a neutral state to maintain a locking state.

Figure 5:
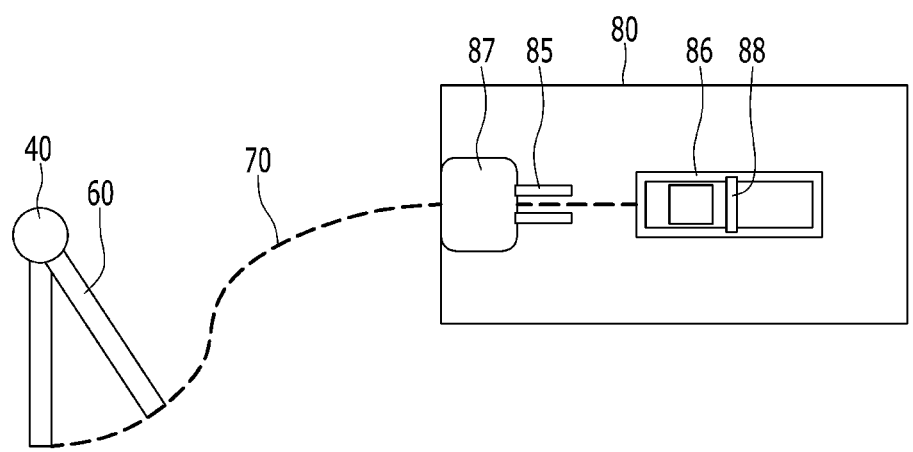
FIG. 5 is a conceptual diagram illustrating a neutral state maintaining lock and release device according to an exemplary embodiment of the present invention.
Figure 6:
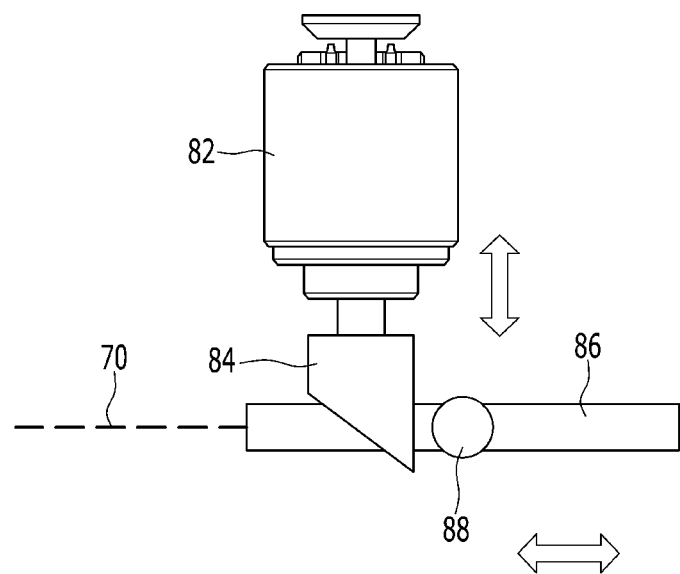
FIG. 6 is a conceptual diagram illustrating operation state of a neutral state maintaining lock and release device according to an exemplary embodiment of the present invention.
Figure 7:
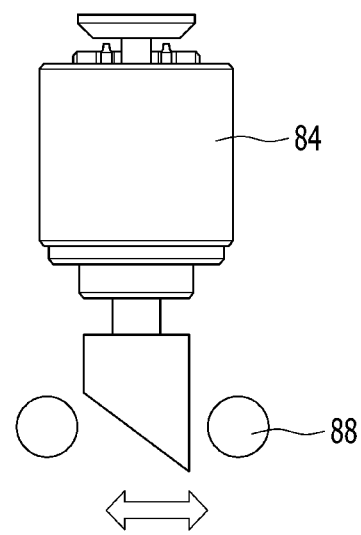
FIG. 7 is a conceptual diagram illustrating operation state of a neutral state maintaining lock and release device according to an exemplary embodiment of the present invention.

FIG. 5 is a conceptual diagram illustrating a neutral state maintaining lock and release device according to an exemplary embodiment of the present invention, FIG. 6 is a conceptual diagram illustrating operation state of a neutral state maintaining lock and release device according to an exemplary embodiment of the present invention, and FIG. 7 is a conceptual diagram illustrating operation state of a neutral state maintaining lock and release device according to an exemplary embodiment of the present invention.

Referring to FIG. 5 and FIG. 7, the neutral state maintaining lock and release device 80 according to an exemplary embodiment of the present invention may include an eye end 86, a roller 88, a solenoid body 82, and a sliding cam 84. In particular, the eye end 86 may be connected with the parking release cable 70 and may be configured to move forward and backward in a horizontal direction. The eye end 86 may be formed as a square frame. Additionally, the roller 88 may be disposed at the eye end 86 and may be configured to move and rotate in a horizontal direction to move the eye end 86 with the parking release cable 70 in a horizontal direction. The roller 88 may be disposed at a center portion of the eye end 86 and may be formed in a cylindrical shape.

Furthermore, power may be on or off in the solenoid body 82 and the solenoid body 82 may be configured to move in a vertical direction with respect to the eye end 86. The sliding cam 84 may be disposed at a lower side of the solenoid body 82 and the sliding cam 84 may contact the roller 88 to move the eye end 86 or restrict movement of the eye end 86. The parking release cable 70 may be connected with the neutral state maintaining lock and release device 80 by a socket 87 provided in the neutral state maintaining lock and release device 80, and the parking release cable 70 may be inserted into and guided by a guide pipe 85 disposed at the socket 87 to be connected with the eye end 86.

As shown in FIG. 5 and FIG. 6, the sliding cam 84 may be formed in a cylindrical shape having an incline plane at one side (e.g., a first side thereof). The sliding cam 84 may contact the roller 88 by the rotational movement of the roller 88 in a horizontal direction, and the roller 88 may contact the incline plane of the sliding cam 84. The solenoid body 82 connected with the sliding cam 84 may be configured to move upwards in a vertical direction.

A vertical plane may be formed at an opposite side (e.g., a second side) of the incline plane of the sliding cam 84. The roller 88 may contact the incline plane of the sliding cam 84 and may be configured to move the solenoid body 82. The eye end 86 may continue to move (e.g., moves further), the roller 88 may move on the incline plane of the sliding cam 84, and the solenoid body 82 may move toward lower side and the roller 88 may contact the vertical plane. Accordingly, the eye end 86 may be restricted to move toward the control lever 60 in the horizontal direction. The roller 88 may be positioned at the incline plane of the sliding cam 84 in the neutral state maintaining release state, the roller 88 may be configured to rotate and move in a horizontal direction to an opposite side of the control lever 60 to move the eye end 86 in a horizontal direction to the opposite side of the control lever 60 in the neutral state maintaining lock state, and the roller 88 may contact the vertical plane of the sliding cam 84 thus, restricting movement of the eye end 86.

Accordingly, although engine starting of the vehicle is suddenly off (e.g., the vehicle engine is suddenly turned off), the control lever 60 may maintain the neutral state maintaining lock state, thus preventing damage to transmission and preventing the vehicle from being overthrown. When speed of the vehicle is reduced sufficiently, the neutral state maintaining lock state is released, and the vehicle may be changed to a parking state and power may be applied to the solenoid provided in the solenoid body 82. The solenoid body 82 may be configured to move toward vertical upper side direction and the control shaft 40 may be configured to rotate by elastic force of the detent return spring 50. The parking lever 30 and the control lever 60 may be configured to rotate by rotation of the control shaft 40, the eye end 86 may be moved toward the control lever 60, and the roller 88 may be moved toward and contact the incline plane of the sliding cam 84. The solenoid body 82 may then be moved toward vertical lower side thus changing the vehicle to the parking state.

Similarly, according to an exemplary embodiment of the present invention, when an engine starting is unexpectedly off while the vehicle is being driven, a neutral state (e.g., not a P stage) may be maintained until the vehicle speed is reduced sufficiently, and thus, damage to the transmission may be prevented and the vehicle may be prevented from being overthrown in advance. Further, vehicle cost and weight may be reduced by applying the neutral state maintaining lock and release device and the parking release cable instead of a conventional hydraulic pressure cylinder.

While this invention has been described in connection with what is presently considered to be exemplary embodiments, it is to be understood that the invention is not limited to the disclosed exemplary embodiments. On the contrary, it is intended to cover various modifications and equivalent arrangements included within the spirit and scope of the appended claims.

DESCRIPTION OF SYMBOLS

10: parking gear
20: parking rod

30: parking lever
40: control shaft
50: detent return spring
60: control lever
70: parking release cable
80: neutral state maintaining lock and release device
82: solenoid body
84: sliding cam
86: eye end
88: roller

What is claimed is:

1. A transmission parking system, comprising:
a parking gear;
a parking rod connected with the parking gear;
a parking lever having a first end connected with the parking rod, wherein the parking lever is installed rotatably around a control shaft;
a detent return spring wound around an exterior circumference of the control shaft, supporting the parking lever, and providing elastic force to rotate the parking lever and return to an original position;
a control lever installed rotatably around the control shaft and installed at an exterior side of the parking lever to allow for user operation; and
a neutral state maintaining lock and release device connected with the control lever and changed to be a neutral state lock or a neutral state release based on an operation of the control lever.

2. The transmission parking system of claim 1, wherein the neutral state maintaining lock and release device is connected with the control lever by a parking release cable.

3. The transmission parking system of claim 2, wherein the parking release cable moves toward the control lever in a neutral state maintaining release state, and moves toward an opposite side of the control lever in a neutral state maintaining locking state.

4. The transmission parking system of claim 3, wherein the neutral state maintaining lock and release device includes:
an eye end connected with the parking release cable and configured to move forward and backward in a horizontal direction;
a roller disposed at the eye end and configured to move and rotate in a horizontal direction to move the eye end in a horizontal direction;
a solenoid body in which power is on or off and configured to move in a vertical direction with respect to the eye end; and
a sliding cam disposed at a first side of the solenoid body and disposed in contact with the roller to move the eye end or restrict movement of the eye end.

5. The transmission parking system of claim 4, wherein the sliding cam has an incline plane at a first side thereof, and the roller contacts the incline plane when the roller rotates and moves in a horizontal direction and the solenoid body moves in a vertical direction.

6. The transmission parking system of claim 5, wherein the sliding cam has a vertical plane at an opposite side to the first side, and the roller contacts the vertical plane to restrict movement of the eye end.

7. The transmission parking system of claim 6, wherein the roller is positioned at the incline plane of the sliding cam in the neutral state maintaining release state.

8. The transmission parking system of claim 6, wherein the roller is configured to rotate and move in a horizontal direction to an opposite side of the control lever to move the eye end in a horizontal direction to the opposite side of the control lever in the neutral state maintaining lock state.

9. The transmission parking system of claim 6, wherein power is on in a solenoid in the solenoid body to move the solenoid body in a vertical direction, and the roller is configured to move from the vertical plane to the incline plane of the sliding cam in the neutral state maintaining release state.

10. The transmission parking system of claim 2, wherein the parking release cable is connected with the neutral state maintaining lock and release device by a socket.

11. The transmission parking system of claim 10, wherein the parking release cable is inserted into and guided by a guide pipe disposed at the socket to be connected with the eye end.

12. A vehicle having the transmission parking system of claim 1.

* * * * *